(12) United States Patent
Shimizu

(10) Patent No.: US 6,714,690 B1
(45) Date of Patent: Mar. 30, 2004

(54) IMAGE PROCESSING DEVICE HAVING MATRIX COMPUTING UNITS

(75) Inventor: Yusuke Shimizu, Tokyo (JP)

(73) Assignee: Sega Enterprises, Ltd. (JP)

( * ) Notice: Subject to any disclaimer, the term of this patent is extended or adjusted under 35 U.S.C. 154(b) by 652 days.

(21) Appl. No.: 09/689,643

(22) Filed: Oct. 13, 2000

(30) Foreign Application Priority Data

Oct. 14, 1999 (JP) .......................................... 11-292950

(51) Int. Cl.[7] ................................................ G06K 9/32
(52) U.S. Cl. ........................ 382/293; 345/427; 345/619
(58) Field of Search ................................ 382/276, 293, 382/300; 345/619, 689, 600, 606, 418, 422, 427; 348/580, 441, 445; 708/442, 290; 358/525

(56) References Cited

U.S. PATENT DOCUMENTS

| | | | | |
|---|---|---|---|---|
| 5,448,690 A | * | 9/1995 | Shiraishi et al. | 345/853 |
| 5,455,900 A | * | 10/1995 | Shiraishi et al. | 345/441 |
| 5,830,066 A | * | 11/1998 | Goden et al. | 463/33 |
| 5,852,446 A | * | 12/1998 | Hashimoto et al. | 345/441 |
| 5,877,769 A | * | 3/1999 | Shinohara | 345/419 |
| 6,343,987 B2 | * | 2/2002 | Hayama et al. | 463/1 |
| 6,373,491 B1 | * | 4/2002 | Sasaki | 345/443 |
| 6,373,494 B1 | * | 4/2002 | Horioka et al. | 345/581 |
| 6,411,290 B1 | * | 6/2002 | Sasaki | 345/418 |

FOREIGN PATENT DOCUMENTS

JP 10-3466 1/1998

* cited by examiner

*Primary Examiner*—Samir Ahmed
(74) *Attorney, Agent, or Firm*—Dickstein Shapiro Morin & Oshinsky LLP (57) ABSTRACT

A geometry processor 10 has an image processing device having a matrix computing unit 14 that is connected to a vector bus VB through which coordinate conversion target data is supplied and a matrix bus MB through which coordinate conversion matrix is supplied, and that performs multiplication of the coordinate conversion target data by the coordinate conversion matrix, wherein the processor is provided with a switching unit 24 that supplies a mixture ratio S28 to the vector bus VB and interpolation computation target data S18 to the matrix bus MB, and wherein the matrix computing unit 14 performs interpolation computation of the interpolation computation target data S18 in accordance with the mixture ratio S28. According to this invention, the interpolation computation needed for a subdivision surface process and other processes may be performed using the matrix computing unit 14 provided in the geometry processor, normally for the purpose of coordinate conversion. Therefore, it is not necessary to incorporate a dedicated interpolation computing unit in the geometry processor, and the circuit size of the geometry processor may be reduced. Furthermore, the vector product computation may be performed using the matrix computing unit 14.

10 Claims, 8 Drawing Sheets

Matrix Computing Unit (During Vector Product Computation)

Drawing to Explain Polygon Subdivision and Weighted Interpolation

FIG. 5(1)

FIG. 5(2) Edge Midpoint e Polygon Midpoint q

FIG. 5(3) Subdivision

FIG. 5(4) Interpolation Regarding Midpoint e

FIG. 5(5) Interppolation Regarding Vertex p

Drawing to Explain Subdivision and Interpolation Regarding Hexahedron

IMAGE PROCESSING DEVICE HAVING MATRIX COMPUTING UNITS

BACKGROUND OF THE INVENTION

1. Field of the Invention

The present invention relates to an image processing device such as a geometry processor having matrix computing units, and more particularly to an image processing device in which the matrix computing units that perform matrix computation for coordinate conversion may also be used for interpolation computation regarding polygon vertex coordinates needed for such processes as a subdivision process and vector product computation needed for a prescribed process.

2. Description of the Related Art

Image processing devices that use computer graphics are capable of generating images for simulation, games and other purposes on a real-time basis. Large-scale image processing devices have been developed in recent years that perform various computation processes at high speed in order to generate high-quality images.

A typical image processing device has a geometry processor to convert the coordinates of a polygon comprising an object defined within a local coordinate system into global coordinates and further to perform perspective view conversion of these coordinates into two-dimensional coordinates such as for a display screen, and a renderer processor that generates image data including color data regarding the polygon within the display screen that was generated via the geometry program. The image data generated by the renderer processor is supplied to the display device, whereupon the generated image is displayed.

During a simulation or game, the operator inputs prescribed operation commands. The simulation program or game program processes the input commands and moves the object. In order to move the object, the game program, etc. generates a coordinate conversion matrix that has a rotation component and a parallel displacement component to move the object, and supplies the matrix to the geometry processor together with the local coordinates of the polygon comprising the object.

The geometry processor performs matrix computation in which the abovementioned supplied local coordinates of the polygon are multiplied by the coordinate conversion matrix to seek the position of the polygon in the global coordinate system after it is shifted. The geometry processor then performs perspective view conversion of the polygon, and supplies to the renderer processor polygon data that corresponds to the two-dimensional coordinates in the display screen.

As described above, a typical geometry processor has built-in matrix computing units to carry out the above coordinate conversion.

On the other hand, a subdivision surface process is one form of special image processing. The subdivision surface process is a process to convert an angular polygon into a rounded polygon, or to convert an angular object into a rounded object, and is implemented through repeated interpolation computation regarding multiple sets of vertex point data and point data. In order to carry out such a subdivision surface process, a dedicated interpolation computing unit must be incorporated in the image processing device.

Normal line vectors of a polygon, for example, may be sought through vector product computation of the vectors of the edges comprising the polygon. Where the game program does not supply normal line vectors as vertex data of a polygon, a computing unit that seeks such normal line vectors is needed in the geometry processor. In that case, a dedicated vector product computing unit must be incorporated in the image processing device.

However, if a special computing unit for a subdivision surface process or a special computing unit dedicated to vector product computation are incorporated in the geometry processor, the circuit size of the geometry processor increases, which is undesirable from a cost standpoint. In particular, the geometry processor includes matrix computing units, and a matrix computing unit is a large circuit comprising multiple multiplication units and an adding unit. Additional incorporation of these dedicated computing units in the geometry processor should be avoided.

SUMMARY OF THE INVENTION

An object of the present invention is to provide an image processing device having a geometry processor that is capable of performing interpolation computation without increasing the circuit size.

Another object of the present invention is to provide an image processing device having a geometry processor that is capable of performing vector product computation without increasing the circuit size.

Yet another object of the present invention is to provide an image processing device having a geometry processor that can use for interpolation computation the matrix computing units already incorporated therein.

Yet another object of the present invention is to provide an image processing device having a geometry processor that can use for vector product computation the matrix computing units already incorporated therein.

In order to attain the objects described above, one aspect of the present invention comprises a geometry processor having a matrix computing unit that is connected to a vector bus through which coordinate conversion target data is supplied and a matrix bus through which coordinate conversion matrix is supplied, and that performs multiplication of the coordinate conversion target data by the coordinate conversion matrix, wherein the processor is provided with a switching unit that supplies a mixture ratio to the vector bus and interpolation computation target data to the matrix bus, and wherein the matrix computing unit performs interpolation computation of the interpolation computation target data in accordance with the mixture ratio.

According to this invention, the interpolation computation, needed for a subdivision surface process and other processes may be performed using the matrix computing unit provided in the geometry processor, normally for the purpose of coordinate conversion. Therefore, it is not necessary to incorporate a dedicated interpolation computing unit in the geometry processor, and the circuit size of the geometry processor may be reduced.

Furthermore, another aspect of the present invention comprises a geometry processor having a matrix computing unit that is connected to a vector bus through which coordinate conversion target data is supplied and a matrix bus through which a coordinate conversion matrix is supplied, and that performs multiplication of the coordinate conversion target data by the coordinate conversion matrix, wherein vector product computation of a first vector and a second vector is carried out by the matrix computing unit. In order to allow this to happen, a switching unit is incorporated that supplies the first vector data to the vector bus and supplies vector product computation matrix data generated from the second vector data to the matrix bus.

In accordance with the invention described above, the vector product computation required in a process in which the normal line vectors of a polygon are sought may be carried out using the matrix computing unit provided in the geometry processor for the purpose of coordinate conversion. Therefore, it is not necessary to incorporate a dedicated vector product computing unit, and the circuit size may be reduced.

In order to attain the objects described above, yet another aspect of the present invention is an image processing device comprising: a matrix computing unit for performing multiplication of first and second matrix data, said matrix computing unit being connected to a vector bus through which said first matrix data is supplied, as well as to a matrix bus through which said second matrix data is supplied; and a data supply unit for supplying coordinate conversion target data to said vector bus and a coordinate conversion matrix to said matrix bus during a coordinate conversion process, and supplying a mixture ratio to said vector bus and interpolation computation target data to said matrix bus during interpolation computation.

In order to attain the objects described above, yet another aspect of the present invention is An image processing device comprising: a matrix computing unit for performing multiplication of first and second matrix data, said matrix computing unit being connected to a vector bus through which said first matrix data is supplied, as well as to a matrix bus through which said second matrix data is supplied; and a data supply unit for supplying coordinate conversion target data to said vector bus and a coordinate conversion matrix to said matrix bus during a coordinate conversion process, and supplying first vector data to said vector bus and vector product computation matrix data generated from second vector data to said matrix bus during vector product computation.

DESCRIPTION OF THE PREFERRED EMBODIMENTS

An embodiment of the present invention is explained below with reference to the drawings. However, this embodiment does not limit the technical scope of the present invention.

Figure 1:
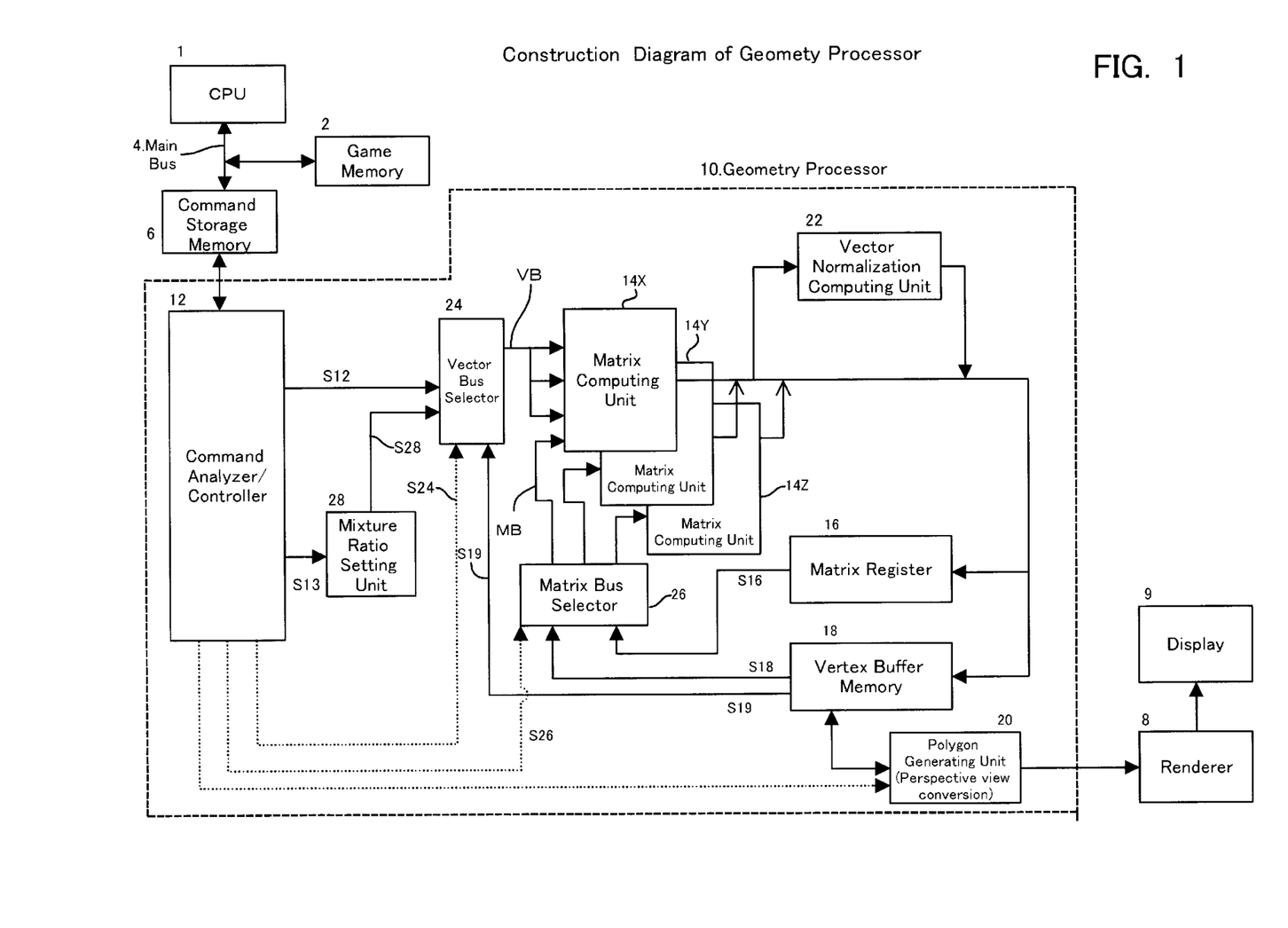
FIG. 1 is a block diagram showing the construction of an image processing device including a geometry processor of one embodiment of the present invention.

FIG. 1 is a block diagram showing the construction of the image processing device incorporating a geometry processor comprising an embodiment of the present invention. The image processing device has a memory 2 in which a game or simulation program is recorded, a CPU 1 that executes the game or simulation program, a command storage memory 6 that stores image draw commands generated by the CPU 1 when it executes the program, a geometry processor 10 that executes the image draw commands recorded in the command storage memory 6, a renderer 8 that performs rendering according to the-polygon vertex data generated by the geometry processor 10, and a display 9 that displays an image according to the image data generated by the renderer 8.

The geometry processor 10 performs, first, matrix conversion in which the polygon data describing an object undergoes coordinate conversion via a coordinate conversion matrix that shows the degree of rotation and shift as the game progresses, and secondly, perspective view conversion in which the polygon data within the world coordinate system (three-dimensional coordinate system), which has undergone matrix conversion, is converted into two-dimensional coordinates inside the display screen. The matrix conversion is performed by matrix computing units 14, while the perspective view conversion is carried out by a polygon generating unit 20.

The geometry processor 10 has a command analyzer/controller 12 that reads out an image draw command stored in the command storage memory 6, analyzes it, and performs image processing control in accordance with the image draw command, and a matrix register 16 that stores the coordinate conversion matrix used during matrix conversion. Matrix computation for matrix conversion is carried out by the matrix computing units 14. For matrix conversion, coordinate conversion target data is supplied to the matrix computing units 14 from the command analyzer/controller 12 or the vertex buffer memory via the vector buses VB, on the one hand, while a coordinate conversion matrix is supplied to the matrix computing units 14 from the matrix register 16 via the matrix buses MB, on the other hand. The results of the computations based on these sets of data are then stored in the vertex buffer memory 18.

A polygon is generally defined through its vertex data. Vertex data includes, for example, attribute data comprising coordinates and normal line vectors, as well as color data, texture coordinates, level of detail (LOD), and the like. In matrix conversion, vertex coordinates are multiplied by the coordinate conversion matrix using the matrix computing units 14, and vertex coordinates that have undergone coordinate conversion (post-conversion coordinates) are generated and stored in the vertex buffer memory 18. Normal line vectors are also multiplied by the coordinate conversion matrix using the matrix computing units 14, and the converted normal line vectors are normalized using the vector normalization computing unit 22 and the results are stored in the vertex buffer memory 18. Furthermore, other types of attribute data are also multiplied by the coordinate conversion matrix where so desired, and the results are stored in the vertex buffer memory 18.

Use of the matrix computing units 14 in the matrix conversion process described above is also seen in conventional geometry processors.

The geometry processor shown in FIG. 1 characteristically includes selectors 24 and 26 in order to supply other computation target data to the vector buses VB and the matrix buses MB, so that the matrix computing units 14 may operate during the matrix conversion process for coordinate conversion as well as during other processes, such as interpolation computation and vector product computation, for example.

For example, where interpolation computation is performed, mixture ratio data S28 generated by the mixture ratio setting unit 28 is selected by the vector bus selector 24 and supplied to the matrix computing units 14 via the vector buses VB. This mixture ratio is generated by the mixture ratio setting unit 28 according to the mixture ratio generation data S13, described below, supplied by the command analyzer/controller 12. On the other hand, the matrix bus selector 26 selects interpolation computation target data S18 that was stored in advance in the vertex buffer memory 18 and supplies it to the matrix computing units 14 via the matrix buses MB. The matrix computing units 14 perform multiplication of the interpolation computation target data S18 and the mixture ratio data S28, and stores the results of this computation in the vertex buffer memory 18.

On the other hand, where vector product computation is carried out, the vector bus selector 24 selects the vector data S12 supplied by the command analyzer/controller 12 or the first vector data S19 stored in advance in the vertex buffer memory 18, and supplies the selected data to the matrix computing units 14 via the vector buses VB. The matrix bus selector 26 selects vector product computation matrix data S18, which comprises a variation of the second vector stored in advance in the vertex buffer memory 18, and supplies the data to the matrix computing units 14 via the matrix buses MB. The matrix computing units 14 perform multiplication of the data thus supplied, and the results of this computation are stored in the vertex buffer memory 18 once more.

Figure 2:
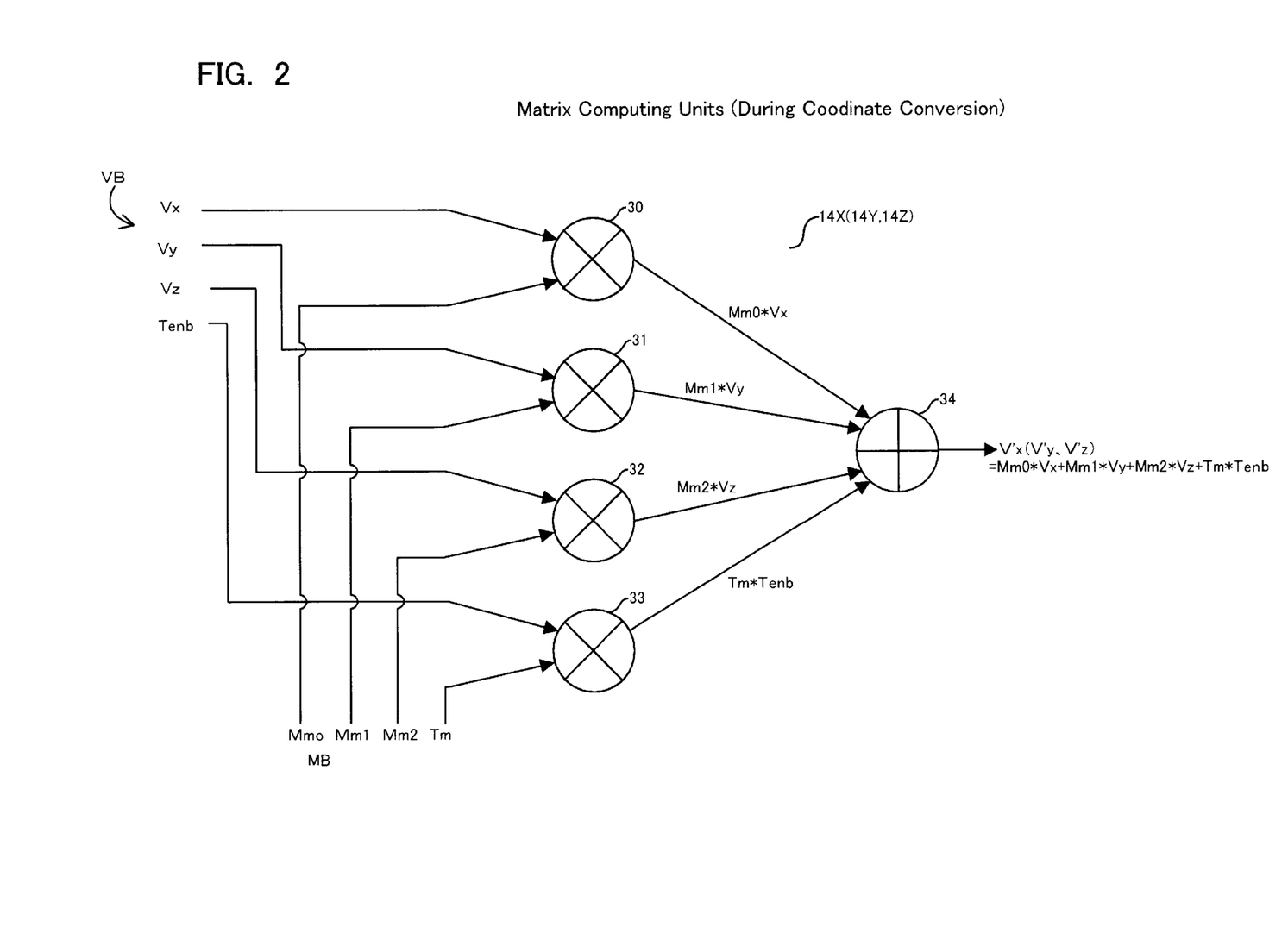
FIG. 2 is a block diagram showing the construction of the matrix computing units when a coordinate conversion process is performed.
Figure 3:
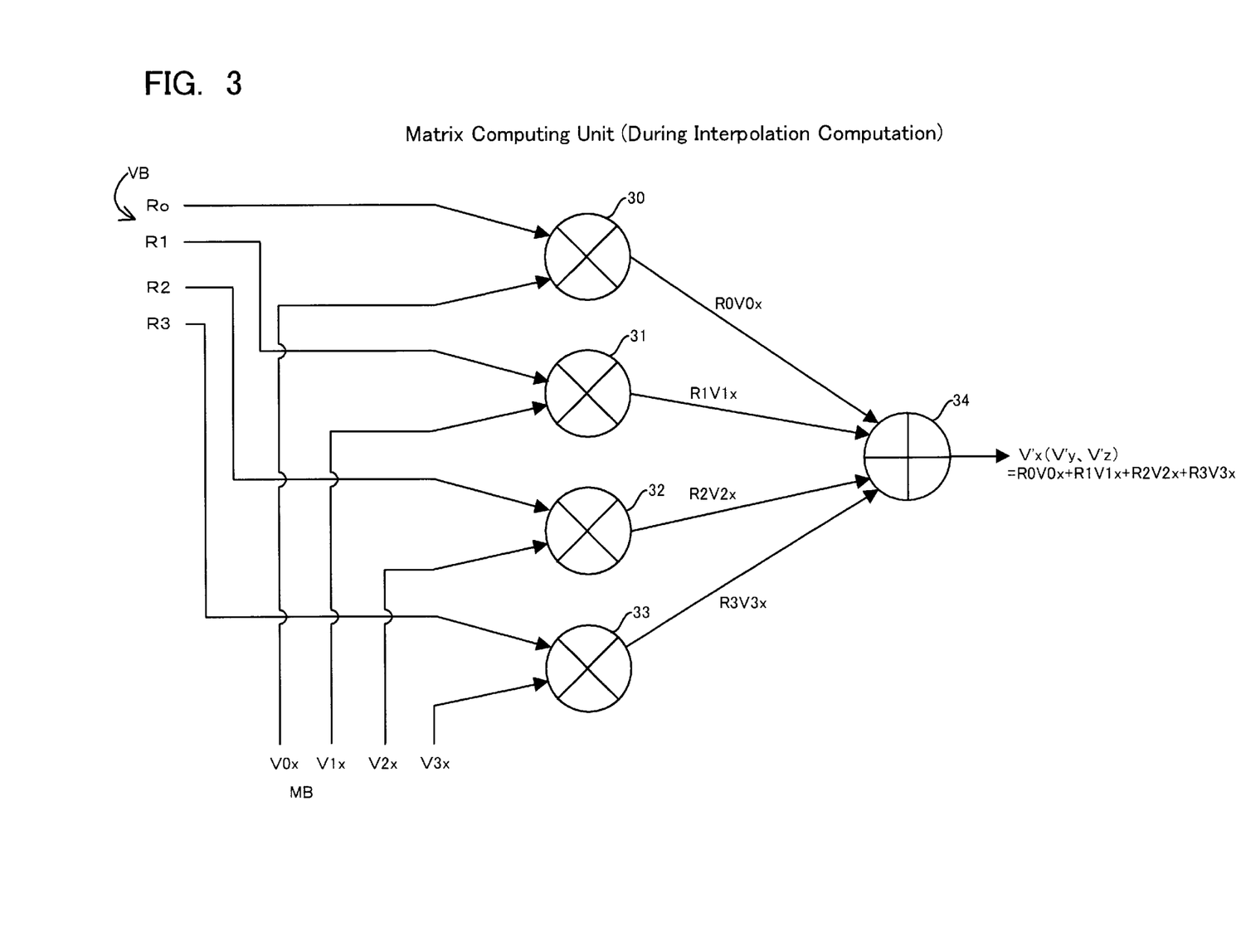
FIG. 3 is a block diagram showing the matrix computing units when interpolation computation is performed.
Figure 4:
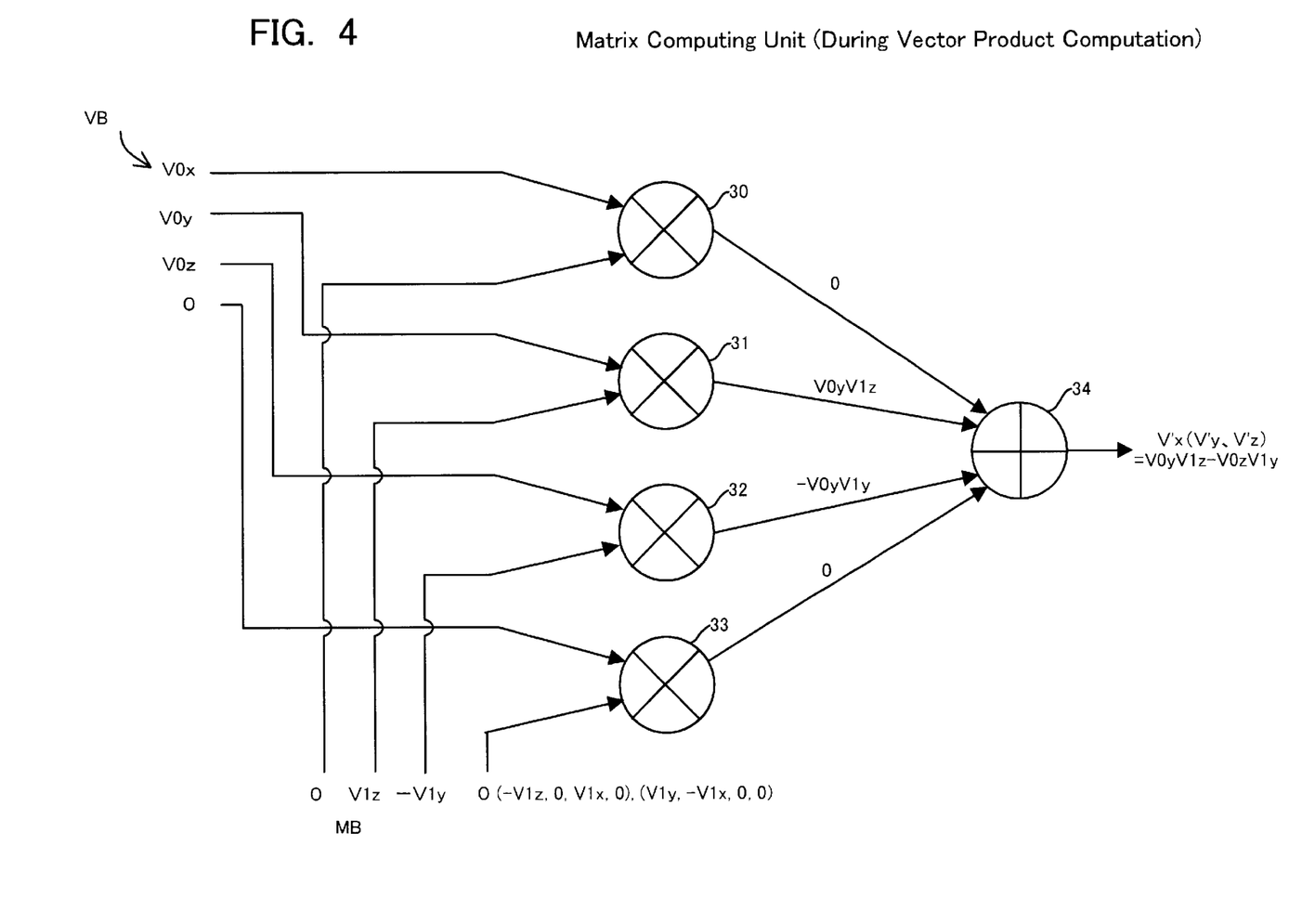
FIG. 4 is a block diagram showing the construction of the matrix computing units when vector product computation is performed.

The matrix conversion computation for coordinate conversion, interpolation computation in a subdivision surface process and vector product computation are explained below in specific terms. The explanation makes it clear that these computations are carried out using the same matrix computing units 14. FIGS. 2, 3 and 4 are block diagrams showing the matrix computing units when coordinate conversion, interpolation computation and vector product computation are performed.

Coordinate Conversion

A polygon that constitutes an object is generally defined within a local coordinate system. A polygon is generally defined through the vertex data that describes the polygon. When a game program or simulation program is executed, the object undergoes a prescribed rotation and shift in location. The world coordinates (Vx', Vy', Vz') after coordinate conversion are obtained by multiplying the vertex data (Vx, Vy, Vz) within the local coordinate system, which is expressed in terms of a matrix comprising four: rows and one column, by a coordinate conversion matrix, which is a three-row and four-column matrix comprising Mmn and Tm (m=0,1,2, n=0,1,2) as the elements of each row.

This computing equation is shown below.

Coordinate conversion (matrix conversion) computing equation $$\begin{pmatrix} V'x \\ V'y \\ V'z \end{pmatrix} = \begin{pmatrix} M00 & M01 & M02 & T0 \\ M10 & M11 & M12 & T1 \\ M20 & M21 & M22 & T2 \end{pmatrix} \begin{pmatrix} Vx \\ Vy \\ Vz \\ Tenb \end{pmatrix} \quad (1)$$

where,
Vx, Vy and Vz represent a vertex prior to conversion;
Tenb defines whether parallel displacement is permitted (1) or prohibited (0);
Mmn is a rotation component, while Tm is a parallel displacement component; and
V'x, V'y and V'z represent a vertex after conversion.

In the equation (1) above, Tenb is the data that indicates whether parallel displacement is (1) permitted or (0) prohibited. In the case of coordinate conversion regarding vertex coordinates, Tenb is set as '1' and parallel displacement is permitted, but in the case of coordinate conversion regarding a normal line vector, Tenb is set as '0' and parallel displacement is prohibited, because in the case of a normal line vector, it is acceptable if coordinate conversion is made using the rotation component, and parallel displacement is not needed.

FIG. 2 is a block diagram showing the matrix computing units when the above coordinate conversion is performed. The matrix computing units 14 have a three-tiered structure in order to perform the computation expressed in equation (1), and comprise a computing unit 14X for the X component, a computing unit 14Y for the Y component and a computing unit 14Z for the Z component. Each computing unit has an identical construction, and has, for example, four multiplication units 30 through 33 and an adding unit 34 that adds the results of the multiplication performed by the multiplication units. Vertex coordinates V (Vx, Vy, Vz) and Tenb, which comprise the data that indicates whether or not to perform parallel displacement, for example, are commonly supplied to the three-tier matrix computing units 14X, 14Y and 14Z as coordinate conversion target data via the four vector busses VB. In addition, the row data Mm0, Mm1, Mm2 and Tm for the coordinate conversion matrix is separately supplied to the matrix computing unit of each tier via the four matrix buses MB. In the computing unit 14X for the X component, the data supplied via each bus is multiplied by the multiplication units 30 through 33, and the multiplication results Mm0*Vx, Mm1*Vy, Mm2*Vz, and Tm*Tenb are added together by the adding unit 34, and the post-conversion vertex coordinate V'x is obtained. Post-conversion vertex coordinates V'y and V'z are also obtained in the same way in the computing unit 14Y for the Y component and the computing unit 14Z for the Z component.

Interpolation Computation

Interpolation computation is repeatedly performed in the subdivision surface process, for example. The subdivision surface process is a process in which an angular polygon is transformed into a rounded polygon by subdividing it and performing interpolation computation. The midpoints of the edges between the vertices of the polygon and the midpoint of the polygon must be sought for the purpose of subdivision, and these midpoints are sought through interpolation computation in which the mixture ratio is made equal for all of these midpoints. These midpoints become the vertices of the polygons obtained as a result of the subdivision. In addition, by performing interpolation computation regarding these midpoints and the vertices using a prescribed mixture ratio, new post-interpolation midpoints and vertices (vertices of the polygons resulting from the subdivision) are obtained.

Figure 5:
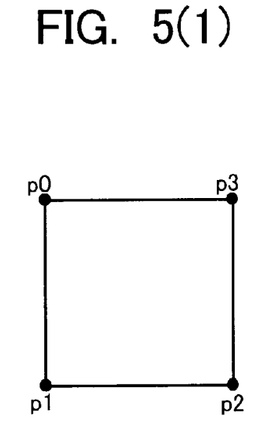
FIG. 5 is a drawing to explain subdivision of a polygon and interpolation with weighting.

FIG. 5 is a drawing to explain the subdivision of a polygon and interpolation with weighting. Interpolation with weighting in this instance refers to interpolation computation using the prescribed mixture ratio, and is synonymous to weighted average computation. The subdivision surface process regarding a square polygon will be explained with reference to FIG. 5.

FIG. 5(1) is a square polygon comprising vertices p0 through p3. The vertices p0 through p3 each have vertex coordinates. FIG. 5(2) shows the midpoints e0 through e3 of each edge between vertices and the midpoint (center) q of the polygon. To seek the midpoints e0 through e3, the following equation is used.

$$e0=(p0+p1)/2 \quad (2)$$

To seek the midpoint q of the polygon, the following equation is used.

$$q=(p0+p1+p2+p3)/4 \quad (3)$$

By using the above computing equations, among the various items of vertex data, such vertex data as vertex coordinates, normal line vectors, texture coordinates and vertex color data at the midpoints e0 through e3 and the midpoint p are sought.

The polygon is subdivided into four polygons as shown in FIG. 5(3) by connecting the edge midpoints e0 through e3 and the polygon midpoint q. After such subdivision, the edge midpoints e0 through e3 are averaged using a prescribed weighting, and post-interpolation edge midpoints e'0 through e'3 are obtained. Interpolation of an edge midpoint is a process in which interpolation is performed from the two vertices p0 and p1 used when the midpoint e0 was sought and the polygon midpoint q, which is connected to the edge midpoint e0, using a prescribed mixture ratio. Where an equal mixture ratio is used for all points, the computing equation is:

$$e'0=(p0+p1+q)/(2+1)=(p0+p1+q)/3 \quad (4)$$

The above mixture ratio is generally a constant that is given depending on the subdivision surface process, and varies depending on how rounded the polygon will be. Where the mixture ratio is ⅓ as shown in the above equation (4), the edge midpoint e0 shifts to the position at which the ratio between its distance to the polygon midpoint q and its distance to its original location is 1:2, and a new post-interpolation edge midpoint e'0 is created.

Vertex interpolation is carried out last. Interpolation of the vertex p0 is a process in which interpolation is performed from the subject vertex p0 and the post-interpolation edge midpoints e'0 and e'3 that are associated to the vertex p0, using a prescribed mixture ratio. For example, where 2:1 interpolation is performed from the vertex p0 and the post-interpolation edge midpoints e'0 and e'3, the computing equation is:

$$p'0 = (p0 + 2(e'0 + e'3))/(1 + 2*2) \quad (5)$$
$$= (p0 + 2(e'0 + e'3))/5$$
$$= p0/5 + 2(e'0 + e'3)/5$$

In this case, it is an interpolation computation (weighted average computation) using a ⅕ and ⅖ mixture ratio. As a result, as shown in FIG. 5(5), four rounded polygons are formed. This is an example of the subdivision surface process. Through the 2:1 interpolation, the vertex p'0 becomes a point closer to the polygon midpoint q.

The above equations (2), (3) and (4) describe interpolation 20 computation (weighted average computation where weighting is equal for all points) in which the mixture ratios are ½, ⅓ and ¼ for all points, respectively, and the equation (5) describes interpolation computation (weighted average computation) in which the mixture ratios are ⅕ and ⅖.

Figure 6:
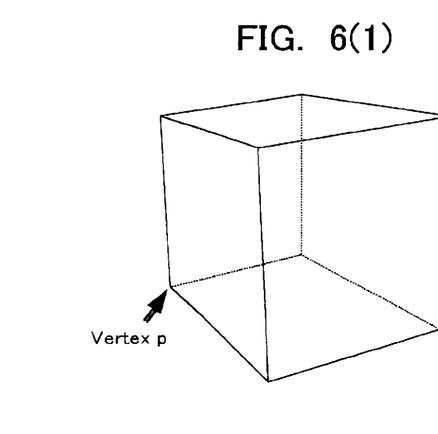
FIG. 6 is a drawing to explain subdivision and interpolation regarding a hexahedron.

FIG. 6 is a drawing to explain the subdivision and interpolation performed on a hexahedron. A case in which a subdivision surface process is performed on a hexahedron to convert it into a rounded cube will be explained. Similar to the sequence shown with reference to FIG. 5, the edge midpoints e and the polygon midpoint q are sought in the hexahedron comprising six polygons defined by vertices p, the polygon is subdivided (FIG. 6(2)), new edge midpoints e' are sought by performing interpolation regarding the edge midpoints (FIG. 6(3)), and new vertices p' are sought by performing interpolation regarding the vertices (FIG. 6(4)) in this case as well. Consequently, a more rounded object is generated based on the new polygons obtained through the subdivision.

The computation used in each process is as shown below.

First, the edge midpoints e are sought using the same equation as shown in the above equation (2). The polygon midpoint q is obtained using the following equation:

$$q = \sum_{i=0}^{k-1} \{pi\}/K \quad (6)$$
$$= (p0 + p1 + p2 + p3)/4 \quad (3)$$

where,
p: Vertex
q: Polygon midpoint
k: Number of vertices

This equation (6) is identical to the above equation (3).

The interpolation regarding the edge midpoints is performed by performing interpolation regarding the two vertices used when seeking each midpoint and the polygon midpoint q connected to the midpoint (total Q) using a prescribed mixture ratio. That is, $$Q = \sum_{i=0}^{m-1} \{qi\} \quad (7)$$
$$e' = (p0 + p1 + Q)/(2 + m)$$
$$= (2*e + Q)/(2 + m)$$
$$= (p0 + p1 + q0 + q1)/4 \quad (m = 2) \quad (8)$$

where,
p: Vertex
e: Edge midpoint
q: Polygon midpoint
Q: Total of polygon midpoints
m: Number of polygon midpoints associated with the edge midpoint
e': Edge midpoint after interpolation As is clear from the equation (7), the above equation is a A computing equation to perform 2:1 interpolation regarding the edge midpoint e and the total Q of the polygon midpoints q. As shown in FIG. 6(2), the vertices p0 and p1 and the polygon midpoints q0 and q1 are used in the interpolation regarding the edge midpoint e0, and as shown in the above equation (8), the new edge midpoint e'0 is sought by performing interpolation computation on these points using a ¼ mixture ratio.

The interpolation for vertices is performed last, as shown in FIG. 6(4), by performing interpolation regarding the edge midpoints e'0, e'1 and e'2 that are associated with the vertex p0 using a prescribed mixture ratio. Using the total E of the post-interpolation edge midpoints e', the computing equation for the interpolation is:

$$E = \sum_{i=0}^{n-1} \{e'i\} \quad (9)$$

$$p' = (p + 2*E)/(1 + 2*n)$$

$$= \frac{1}{7}p0 + \frac{2}{7}e'0 + \frac{2}{7}e'1 + \frac{2}{7}e'2 \quad (n=3) \quad (10)$$

where,
  E: Total of post-interpolation edge midpoints
  n: Number of post-interpolation edge midpoints associated with the vertex
  P': Post-interpolation vertex As is clear from the equation (9), the above equation is a computing equation by which 1:2 interpolation is performed from the total E of the post-interpolation edge midpoints e' and the vertex p0. The post-interpolation vertex p'0 is sought in the manner shown in the equation (10), and becomes a new point p'0 inside the initial cube, as shown in FIG. 6(4). The above equation (10) represents an interpolation computation in which the mixture ratios are 1/7 and 2/7.

An example of interpolation computation in a subdivision surface process was explained above. As described above, in order to perform a subdivision surface process, four tiers of interpolation computations must be performed. The interpolation computations may replace the matrix computations in which the interpolation target coordinate data is multiplied by the mixture ratio and the products are added together.

In other words, if the interpolation target vertex coordinates (Vmx, Vmy, Vmz) (m=0 to 3) are arranged in a matrix form and the mixture ratio for the interpolation for each coordinate is Rm (m=0 to 3), the post-interpolation coordinates (V'x, V'y, V'z) may be expressed via the following equation.

$$\begin{pmatrix} V'x \\ V'y \\ V'z \end{pmatrix} = \begin{pmatrix} V0x & V1x & V2x & V3x \\ V0y & V1y & V2y & V3y \\ V0z & V1z & V2z & V3z \end{pmatrix} \begin{pmatrix} R0 \\ R1 \\ R2 \\ R3 \end{pmatrix} \quad (11)$$

where,
  Vmx, Vmy and Vmz represent an interpolation target vertex.
  Rm is a vertex mixture ratio for the interpolation.
  V'x, V'y and V'z represent the post-replacement vertex.

As can be seen from the equation (11), the interpolation computation comprises multiplication of the three-row, four-column matrix, each row of which comprises the interpolation target vertex data, by a four-row, one-column matrix having the mixture ratio values as its elements.

FIG. 3 is a block diagram showing the matrix computing units when they are used for interpolation computation. In order to execute the above equation (11), if the mixture ratios R0 through R3 are supplied to the vector buses VB of the matrix computing units 14X, 14Y and 14Z, respectively, and the interpolation target vertex coordinate and midpoint coordinate data V0x through V3x is supplied to the matrix buses MB of the computing units, respectively, then the value V'x (V'y, V'z) obtained after multiplication and addition in each computing unit matches the various results of the interpolation computation described above. As shown in the above equation (11), if all of the four buses and multiplication units 30 through 33 are used, interpolation computation may be carried out for four sets of interpolation target coordinates. The number of sets of interpolation target coordinates is selected as needed.

The mixture ratio R for the interpolation computation is sought, as shown in FIG. 1, by the mixture ratio setting unit 28. A weight value a and a divisor n are supplied to the mixture ratio setting unit 28 by the command analyzer/controller 12. The above interpolation equation may be replaced as shown below.

$$\begin{pmatrix} V'x \\ V'y \\ V'z \end{pmatrix} = \begin{pmatrix} V0x & V1x & V2x & V3x \\ V0y & V1y & V2y & V3y \\ V0z & V1z & V2z & V3z \end{pmatrix} \begin{pmatrix} \alpha/n \\ \alpha/n \\ \alpha/n \\ 1-\alpha \end{pmatrix} \quad (11A)$$

$$P' = (1-\alpha) \cdot P + \alpha \frac{E}{n} \quad (12)$$

where,
  α: Weight value
  n: Divisor

In the above equation (12), if α=1, n=2, the above equation becomes the interpolation equation (2). If α=1, n=4, it becomes the interpolation equation (3). Furthermore, if α=1, n=3, it becomes the interpolation equation (4). If α=6/7, n=3, it becomes the interpolation equation (10). Therefore, by defining the above weight value a and the divisor n, the mixture ratio may be generally determined for in the equations (2), (3), (4) and (10). In other words, (1−α) and a/n are equivalent to the mixture ratio R.

Upon receiving the above weight value a and divisor n, the mixture ratio setting unit 28 may generate a mixture ratio S28 and supply it to the vector buses VB.

Vector Product Computation

Vector product computation is defined mathematically. In other words, the product vector V'=(V'x, V'y, V'z) of a first vector V0=(V0x, V0y, V0z) and a second vector V1=(V1x, V1y, V1z) may be expressed via the matrix computing equation shown below.

Vector product computing equation for vector V0=(V0x, V0y, V0z) and V1=(V1x, V1y, V1z)

$$\begin{pmatrix} V'x \\ V'y \\ V'z \end{pmatrix} = \begin{pmatrix} 0 & V1z & -V1y & 0 \\ -V1z & 0 & V1x & 0 \\ V1y & -V1x & 0 & 0 \end{pmatrix} \begin{pmatrix} V0x \\ V0y \\ V0z \\ 0 \end{pmatrix} \quad (13)$$

$$= \begin{pmatrix} V0yV1z - V0zv1y \\ -V0xV1z + V0zV1x \\ V0xV1y - VogV1x \end{pmatrix}$$

In other words, the vector product may be expressed via multiplication of a three-row, four-column matrix, which is generated for vector product computation from the second vector V1, by a four-row, one-column matrix having each component of the first vector V0 as its elements. While the values in the fourth column in the matrix and the fourth row of the vector are both 0, it is acceptable if only one of them is 0.

FIG. 4 is a drawing showing the construction of the matrix computing units when they are used for vector product computation. Where a vector product computation is performed for the first vector V0 and the second vector V1, a four-row, one-column matrix having the values of the first vector V0 as its elements is commonly supplied to the three computing units via the vector buses VB, respectively, while the data for each row of the three-row, four-column vector product computation matrix generated from the second vector V1 is discretely given to each matrix bus MB of the three computing units. This matrix is as shown in the above equation (12). Consequently, the X, Y and Z values of a vector, which comprises the vector product, are respectively sought by the matrix computing units 14X, 14Y and 14Z.

Overall Image Processing

Figure 7:
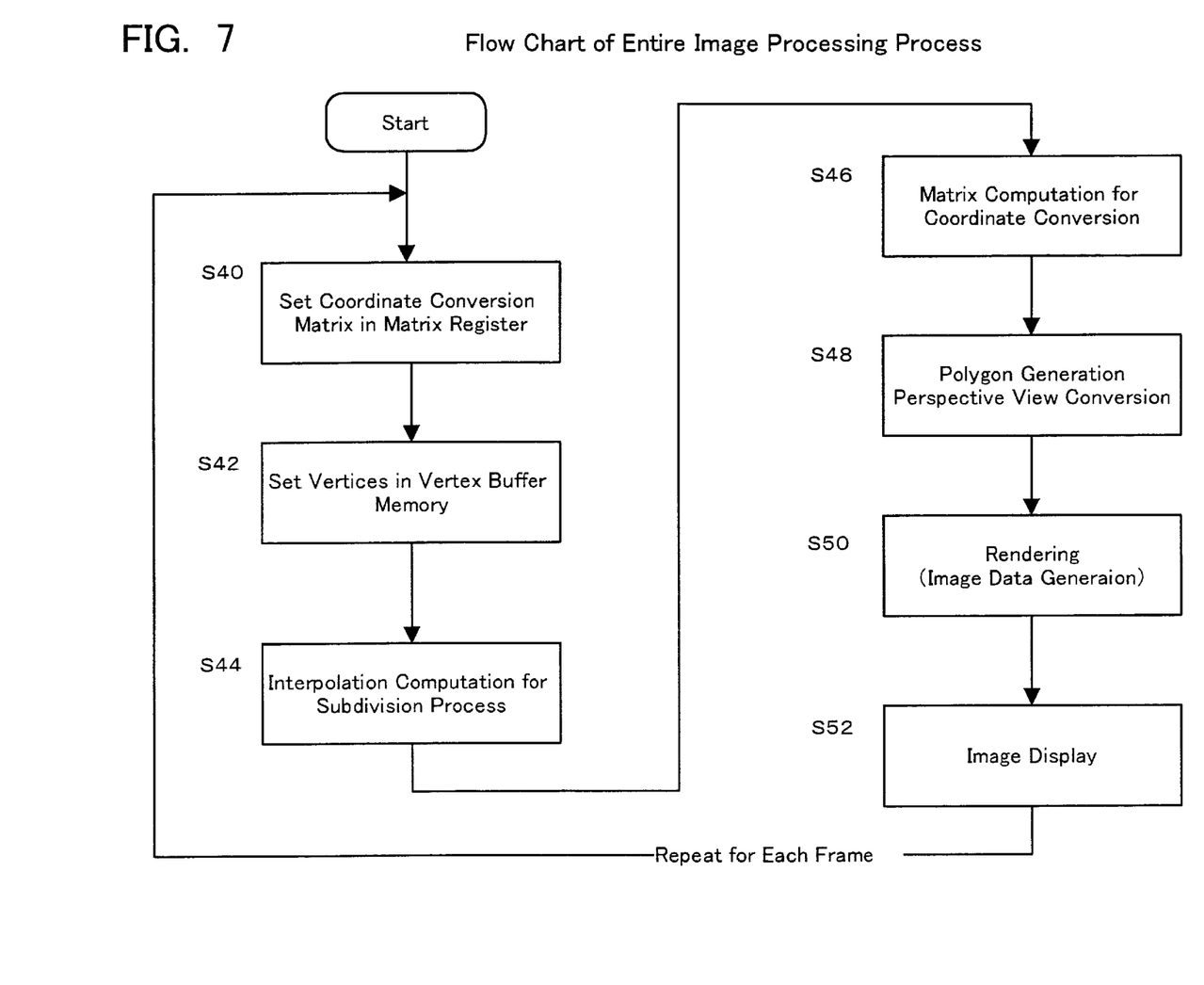
FIG. 7 is a flow chart showing the sequence of the entire image processing process.

The image processing process as a whole will now be explained. FIG. 7 is a flow chart showing the sequence of the entire process. An explanation will be provided here using as an example a case in which image processing including a subdivision surface process is performed.

The CPU 1 shown in FIG. 1 executes the game program in response to the input operation by the operator, and seeks the degree of rotation and shift of the object. It then supplies a series of image processing commands to the command storage memory 6. The first image processing command thus supplied is a coordinate conversion matrix setting command. In response to this command, the command analyzer/controller 12 in the geometry processor 10 records in the matrix register 16 the coordinate conversion matrix stored in the command storage memory 6 together with the command (S40).

A vertex setting command is supplied next. In response to this command, the command analyzer/controller 12 in the geometry processor 10 records in the vertex buffer memory 18 the vertex data stored in the command storage memory 6 together with the command (S42). This vertex setting command is supplied in order to perform a subdivision surface process. Therefore, where this process need not be performed, the vertex data is directly supplied to the matrix computing units 14 via the vector buses VB, such that it is multiplied by the above set coordinate conversion matrix and post-conversion coordinate data is thereby obtained.

Figure 8:
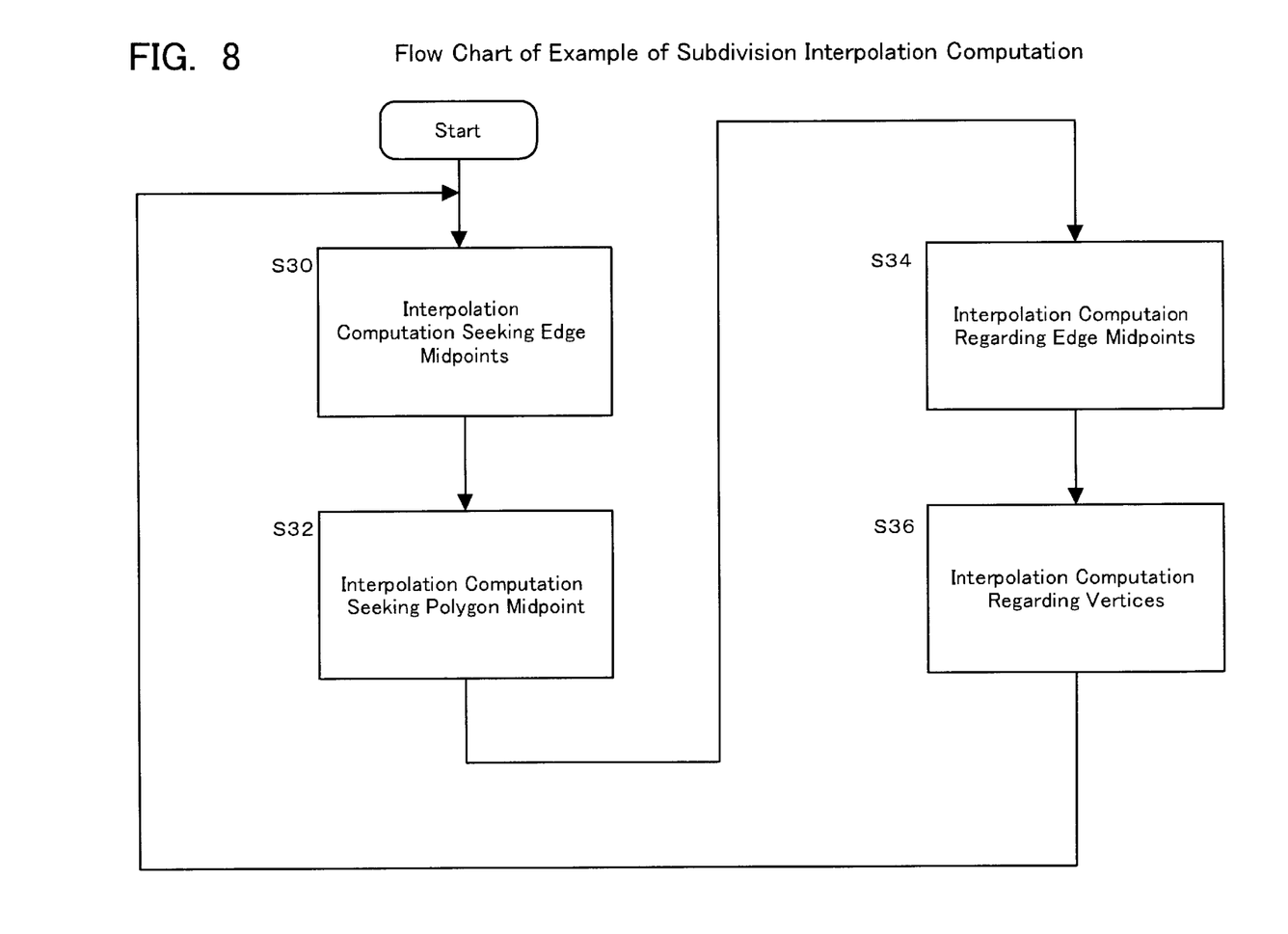
FIG. 8 is a flow chart showing an example of interpolation computation in the subdivision surface process.

A subdivision surface process is then carried out. This process is carried out through multiple interpolation computation commands (S44). FIG. 8 is a flow chart showing an example of interpolation computation in the subdivision surface process. As shown in FIG. 8, the subdivision surface process described above is carried out using a first interpolation computation command by which to seek edge midpoints through interpolation from the vertex coordinates of the polygon (S30), a second interpolation computation command by which to seek the polygon midpoint through interpolation from the vertex coordinates of the polygon (S32), a third interpolation computation command regarding the polygon midpoint (S34), and a fourth command regarding the vertices (S36).

Namely, the program stored in the game memory 2 issues the following four commands in order to carry out the subdivision surface process. As explained with reference to FIG. 5, the program issues a first command by which polygon edge midpoint coordinates e are sought using the interpolation computation target data as the polygon vertex coordinates p, a second command by which the polygon midpoint coordinates q are sought using the interpolation computation target data as the polygon vertex coordinates p, a third command by which the post-interpolation midpoint coordinates e' are sought using the interpolation computation target data as the edge midpoint coordinates e and the polygon midpoint coordinates q, and a fourth command by which the post-interpolation vertex coordinates p' are sought using the interpolation computation target data as the polygon vertex coordinates p and the post-interpolation midpoint coordinates e'. These interpolation computations are performed by the matrix computing units, as described above.

In this series of interpolation computations, the command analyzer/controller 12 analyzes the interpolation computation command, and supplies the weight value α and divisor n attached to the command to the mixture ratio setting unit 28. At the same time, the vector bus selector 24 supplies the mixture ratio data S28 generated by the mixture ratio setting unit 28 to the matrix computing units 14 via the vector buses VB. The matrix bus selector 26 supplies the vertex coordinates S18, which are the interpolation computation target coordinates and are stored in the vertex buffer memory 18, to the matrix computing units 14 via the matrix buses MB. The matrix computing units 14 then carry out interpolation computations, as shown in FIG. 3, and stores the results in a prescribed area of the vertex buffer memory 18.

Where an interpolation computation is carried out from the edge midpoints and polygon midpoint, the midpoint coordinates data S18 stored in the vertex buffer memory 18 is supplied to the matrix computing units 14 via the matrix buses MB, and is multiplied by the matrix having the mixture ratio supplied via the vector buses VB.

As a result of the subdivision surface process, vertex data for a rounded polygon is stored in the vertex buffer memory 18. However, this vertex data is still coordinate data for the local coordinate system.

Returning to FIG. 7, matrix computations for coordinate conversion are performed (S46) after the subdivision surface process. In other words, in the coordinate conversion process, the coordinates data for the local coordinate system are converted into coordinates data for the global coordinate system. When this is done, the coordinate conversion matrix is used, and the data in terms of the global coordinate system of the polygon after rotation and shift is sought.

In the coordinate conversion, as shown in FIG. 2, the vector bus selector 2 4 supplies the vertex data S19 of the subdivided polygon, which is stored in the vertex buffer memory 18, to the matrix computing units 14 via the vector buses VB. Where a subdivision surface process is not to be carried out, the polygon vertex data S12 supplied from the command analyzer/controller 12 is supplied via the vector buses VB. Where a subdivision surface process is to be carried out, the vertex data for the subdivided polygon, which is newly obtained through the above process, is supplied from the vertex buffer memory 18.

On the other hand, the coordinate conversion matrix S16 stored in the matrix register 16 is supplied to the matrix computing units 14 via the matrix buses MB through the matrix bus selector 26. Matrix computations are then performed, as shown in FIG. 2, and the post-conversion vertex data is stored in the vertex buffer memory 18.

This coordinate conversion process described above is performed with regard to all of the polygon vertex data. The scalar values of the normal line vectors are normalized by the vector normalization computing unit 22.

The polygon generating unit 20 then performs perspective view conversion and converts the post-matrix conversion vertex data stored in the vertex buffer memory 18 into two-dimensional coordinates for the display screen using the post-matrix conversion vertex data stored in the vertex buffer memory 18 (S48). The image processing by the geometry processor 10 then comes to an end.

Rendering is performed by the renderer 8, where image data to be displayed is generated and stored in a frame buffer not shown in the drawings (S50). An image is displayed in the display 9 according to the generated image data (S52).

Where vector product computation is needed instead of or in addition to the subdivision surface process described above, a vector product computation command is supplied by the CPU 1. The command analyzer/controller 12 in the geometry processor 10 analyzes the command, and supplies the coordinates S19 of the first vector stored in the vertex buffer memory 18 to the matrix computing units 14 via the vector bus selector 24. The vector product computation matrix shown in the equation (12) is generated from the coordinates S18 of the second vector, and is supplied to the matrix computing units 14 via the matrix bus selector 26. The vector product computation matrix may be generated by a generator not shown in the drawings, or, alternatively, the selector 26 may be equipped with this function.

Vector product computation is performed by the matrix computing units 14 as shown in FIG. 4, and the results are stored in the vertex buffer memory 18.

The various commands issued to the geometry processor 10 of one embodiment of the present invention are issued by the program stored in the recording medium of the game memory 2. Therefore, the above program issues the various commands because the geometry processor 10 is caused to perform the subdivision surface process and vector product process.

As explained above, in the geometry processor 10 of one embodiment of the presentation, large-scale matrix computing units 14 each comprising multiplication units and an adding unit are capable of performing interpolation computation and vector product computation in addition to normal coordinate conversion computation. Therefore, interpolation computation and vector product computation may be carried out without substantially increasing the circuit size of the geometry processor 10, so that the circuit size of the entire image processing device may be considerably reduced.

The scope of the present invention is not limited to the example described above, but encompasses the inventions described in the Claims and their equivalents.

Using the present invention, the matrix computing units of an image processing device can be used for purposes other than normal coordinate conversion computation, i.e., interpolation computation and vector product computation, and the circuit size can be reduced.

What is claimed is:

1. An image processing device comprising:
    a matrix computing unit for performing multiplication of first and second matrix data, said matrix computing unit being connected to a vector bus through which said first matrix data is supplied, as well as to a matrix bus through which said second matrix data is supplied; and
    a data supply unit for supplying coordinate conversion target data to said vector bus and a coordinate conversion matrix to said matrix bus during a coordinate conversion process, and supplying a mixture ratio to said vector bus and interpolation computation target data to said matrix bus during interpolation computation.

2. An image processing device comprising:
    a matrix computing unit for performing multiplication of first and second matrix data, said matrix computing unit being connected to a vector bus through which said first matrix data is supplied, as well as to a matrix bus through which said second matrix data is supplied; and
    a data supply unit for supplying coordinate conversion target data to said vector bus and a coordinate conversion matrix to said matrix bus during a coordinate conversion process, and supplying first vector data to said vector bus and vector product computation matrix data generated from second vector data to said matrix bus during vector product computation.

3. The image processing device according to claim 1 or 2, wherein said matrix computing unit has a plurality of multiplication units that each perform multiplication of a plurality of data units supplied through said vector bus and a plurality of data units supplied through said matrix bus, and an adding unit that adds the results of the multiplication by said multiplication units.

4. The image processing device according to claim 3, wherein said matrix computing units are arranged in hierarchies that correspond to the number of the rows of said second matrix data, and said first matrix data is commonly supplied to said matrix computing unit in each hierarchy, and the data for each row of said second matrix data is supplied to said matrix computing unit of said each hierarchy via said matrix bus.

5. The image processing device according to claim 1, further comprising:
    a matrix register for storing said coordinate conversion matrix;
    a buffer memory for storing said coordinate conversion target data and interpolation computation target data: and
    a mixture ratio setting unit for generating said mixture ratio,
    wherein said data supply unit supplies either said coordinate conversion matrix stored in said matrix register or said interpolation computation target data stored in said buffer memory to said matrix bus, and supplies either said coordinate conversion target data or said mixture ratio generated by said mixture ratio setting unit to said vector bus.

6. The image processing device according to claim 2, further comprising:
    a matrix register for storing said coordinate conversion matrix; and
    a buffer memory for storing said coordinate conversion target data, and said first and second matrix data,
    wherein said data supply unit supplies either said coordinate conversion matrix stored in said matrix register or said vector product computation matrix data generated from the second vector stored in said buffer memory to said matrix bus, and supplies either said coordinate conversion data or said first vector data to said vector bus.

7. The image processing device according to claim 1 or 2, wherein said coordinate conversion target data comprises vertex data that describes a polygon.

8. The image processing device according to claim 1 or 2, wherein said interpolation computation target data includes vertex data that constitutes a polygon.

9. A program product for causing a image processing device having a matrix computing unit to perform a coordinate conversion process, interpolation computation process or vector product computation process, said matrix computing unit being connected to a vector bus through which first matrix data is supplied as well as to a matrix bus through which second matrix data is supplied, and performing multiplication of said first and second matrix data, comprising the steps of:
    generating commands that supply coordinate conversion target data to said vector bus and a coordinate conversion matrix to said matrix bus, and cause said matrix computing unit to perform multiplication during a coordinate conversion process;
    generating commands that supply a mixture ratio to said vector bus and interpolation computation target data to said matrix bus and cause said matrix computing unit to perform multiplication during an interpolation computation; and generating commands that supply first vector data to said vector bus and vector product computation matrix data generated from second vector data to said matrix bus, and cause said matrix computing unit to perform multiplication during vector product computation.

10. A program product for causing a image processing device having a matrix computing unit to perform a subdivision surface process, said matrix computing unit being connected to a vector bus through which first matrix data is supplied as well as to a matrix bus through which second matrix data is supplied, and performing multiplication of said first and second matrix data, to perform a subdivision surface process, wherein said program generates commands that supply a mixture ratio to said vector bus and interpolation computation target data to said matrix bus, and causes said matrix computing unit to perform multiplication; and said commands comprise a first command that seeks the polygon edge midpoint coordinates using said interpolation computation target data as the polygon vertex coordinates, a second command that seeks the polygon midpoint coordinates using said interpolation computation target data as the polygon vertex coordinates, a third command that seeks midpoint coordinates which have been interpolated using said interpolation computation target data as said edge midpoint coordinates and polygon midpoint coordinates, and a fourth command that seeks vertex coordinates which have been interpolated using said interpolation computation target data as said polygon vertex coordinates and said interpolated midpoint coordinates.

* * * * *